United States Patent
Lim

(10) Patent No.: US 9,479,047 B2
(45) Date of Patent: Oct. 25, 2016

(54) SYSTEM AND METHOD FOR CONTROLLING A POWER SUPPLY WITH A FEED FORWARD CONTROLLER

(71) Applicant: Infineon Technologies Austria AG, Villach (AT)

(72) Inventor: Shu Fan Lim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/526,049

(22) Filed: Oct. 28, 2014

(65) Prior Publication Data

US 2015/0146458 A1    May 28, 2015

Related U.S. Application Data

(60) Provisional application No. 61/909,697, filed on Nov. 27, 2013.

(51) Int. Cl.
    *H02M 1/42*    (2007.01)
    *H02M 3/158*    (2006.01)
    *H02M 3/156*    (2006.01)

(52) U.S. Cl.
    CPC ........... *H02M 1/4225* (2013.01); *H02M 3/156* (2013.01); *H02M 3/158* (2013.01); *Y02B 70/126* (2013.01)

(58) Field of Classification Search
    CPC ...................................... H02M 1/42
    USPC ....................... 323/282, 208, 209
    See application file for complete search history.

(56) References Cited

U.S. PATENT DOCUMENTS

| | | | | |
|---|---|---|---|---|
| 2004/0263140 A1* | 12/2004 | Adragna et al. | ............... | 323/282 |
| 2010/0156965 A1* | 6/2010 | Kim et al. | .................. | 345/691 |
| 2013/0076317 A1* | 3/2013 | Yeh et al. | ...................... | 323/209 |
| 2014/0097808 A1* | 4/2014 | Clark et al. | .................. | 323/208 |

OTHER PUBLICATIONS

Bento, A. et al., "Hybrid One-Cycle Controller for Boost PFC Rectifier," Conference Record of the 2007 IEEE Industry Applications Conference, Sep. 2007, 7 pgs.

Buso, S. et al., "Simple Digital Control Improving Dynamic Performance of Power Factor Preregulators," 28th Annual IEEE Power Electronics Specialists Conference, vol. 1, Jun. 1997, pp. 103-109.

Gusseme, K. D. et al., "Digitally Controlled Boost Power-Factor-Correction Converters Operating in Both Continuous and Discontinuous Conduction Mode," IEEE Transactions on Industrial Electronics, vol. 52, No. 1, Feb. 2005, p. 88-97.

(Continued)

*Primary Examiner* — Matthew Nguyen
*Assistant Examiner* — Trinh Dang
(74) *Attorney, Agent, or Firm* — Slater Matsil, LLP

(57) ABSTRACT

In accordance with an embodiment, a power supply controller includes a current controller configured to control an input current of a power supply. The current controller includes a first feed forward controller having an input configured to be coupled to a first power supply signal, and an output coupled to an output of the current controller. A gain of the first feed forward controller is proportional to a compensation factor when the power supply operates in a discontinuous conduction mode (DCM) and is substantially zero when the power supply operates in a continuous conduction mode (CCM).

21 Claims, 18 Drawing Sheets

(56) References Cited

OTHER PUBLICATIONS

Lim, S. et al., "A Simple Digital DCM Control Scheme for Boost PFC Operating in Both CCM and DCM," IEEE Transactions on Industry Applications, vol. 47, No. 4, Jul.-Aug. 2011, pp. 1802-1812.

Mather, B. et al., "A Digital PFC Controller without Input Voltage Sensing," APEC 2007—Twenty Second Annual IEEE Applied Power Electronics Conference, Feb. 25, 2007-Mar. 1, 2007, pp. 198-204.

Noon, J. "Designing High-Power Factor Off-Line Power Supplies," Texas Instruments Incorporated, 2003, 36 pgs.

Roggia, L. et al., "Digital Control System Applied to a PFC Boost Converter Operating in Mixed Conduction Mode," Brazilian Power Electronics Conference, Sep. 27, 2009-Oct. 1, 2009, pp. 698-704.

* cited by examiner

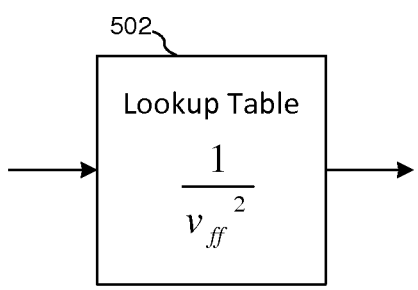 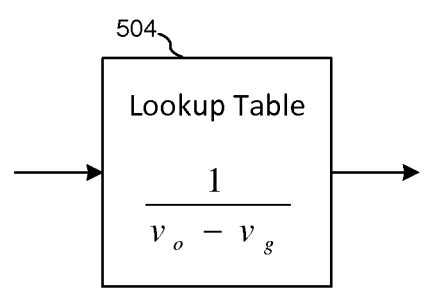
FIG. 19a          FIG. 19b

SYSTEM AND METHOD FOR CONTROLLING A POWER SUPPLY WITH A FEED FORWARD CONTROLLER

This application claims the benefit of U.S. Provisional Application No. 61/909,697, filed on Nov. 27, 2013, which application is hereby incorporated herein by reference.

TECHNICAL FIELD

The present invention relates generally to circuits, and, in particular, to a system and method for a switched mode power supply.

BACKGROUND

Alternating current (AC) direct current (DC) switched mode power supplies may be used for medium to high power applications with power factor correction. An example of a switched mode power supply that may be used for medium to high power applications is a continuous conduction mode (CCM) boost mode power factor corrector (PFC).

In medium to high power applications, such as computer and server applications, it is desirable that the power supplies be efficient and has good power factor performance across a wide load range. It also may be desirable to have low total harmonic distortion, especially at high line and light load conditions.

Digital control for PFCs may be used. The average current control may be used for a boost PFC. With input voltage feed forward, the output DC voltage may be less sensitive to variations in the AC input voltage.

SUMMARY OF THE INVENTION

In accordance with an embodiment, a power supply controller includes a current controller configured to control an input current of a power supply. The current controller includes a first feed forward controller having an input configured to be coupled to a first power supply signal, and an output coupled to an output of the current controller. A gain of the first feed forward controller is proportional to a compensation factor when the power supply operates in a discontinuous conduction mode (DCM) and is substantially zero when the power supply operates in a continuous conduction mode (CCM).

BRIEF DESCRIPTION OF THE DRAWINGS

For a more complete understanding of the present invention, and the advantages thereof, reference is now made to the following descriptions taken in conjunction with the accompanying drawing, in which:

FIGS. 19a-19billustrate embodiment lookup tables.

Figure 1:
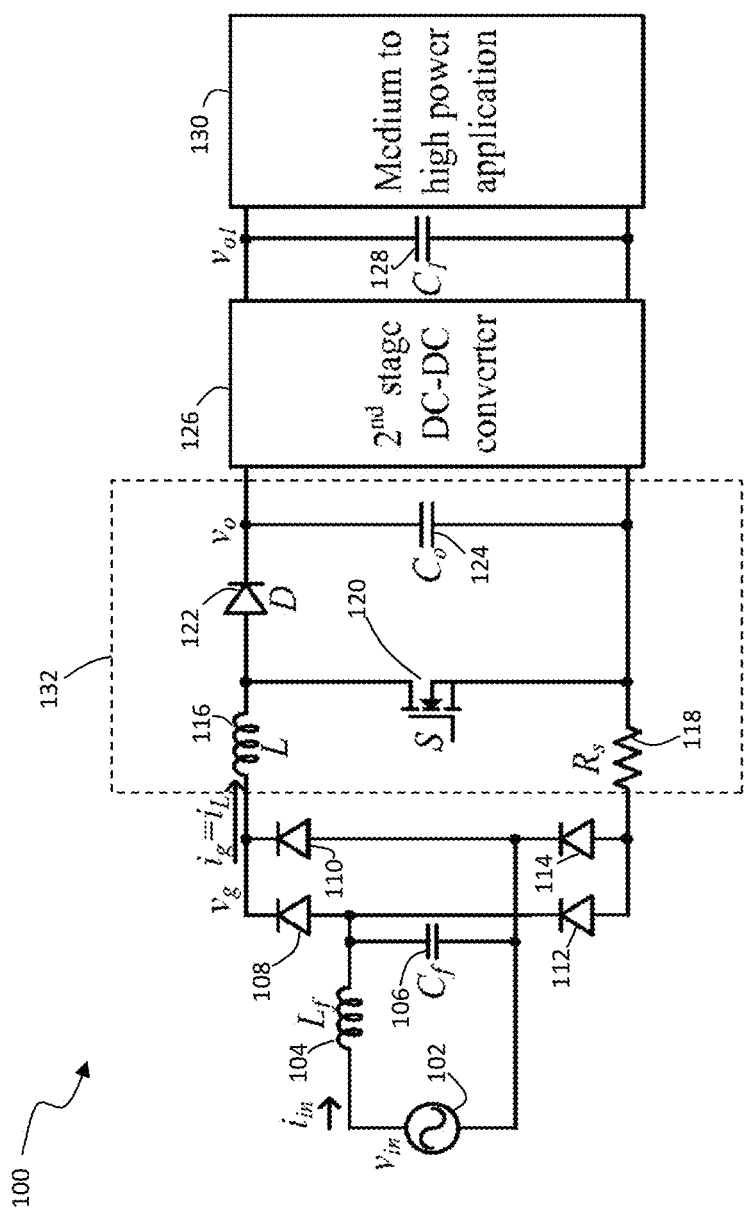
FIG. 1 illustrates an embodiment switched mode power supply.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely switched mode power supplies. The invention may also be applied, however, to other types of circuits, systems, and methods.

Some embodiments are directed toward power factor corrected AC/DC switched mode power supplies for medium to high power applications with power factor correction. In some embodiments, a high power factor is maintained by providing a feed forward path in a current control loop of the switched mode power supply. By providing such a feed forward path, harmonic distortion of the AC input current is reduced, thereby increasing the power factor. In an embodiment, a current controller based on a turn-off duty cycle control variable is used. In some embodiments, a feed forward path of the current controller is activated during discontinuous conduction mode (DCM) and disabled during continuous conduction mode (CCM). By activating the feed forward path during DCM, harmonic distortion due to non-linear operation under low current conditions may be attenuated. Moreover, by deactivating the feed forward path during CCM mode, processing cycles of the power supply controller may be reduced, thereby allowing for higher converter switching frequencies.

In an embodiment, a boost power factor converter (PFC) is controlled using the average current turn-off duty cycle control. The PFC has good input current shaping in both continuous conduction mode (CCM) and discontinuous conduction mode (DCM). It includes an average current control with input voltage feed forward. In an embodiment, changes to an average current control loop enables good input current shaping in both CCM and DCM. Comparing the averaged small signal models of the PFC in both CCM and DCM, disturbances seen on inductor current $i_L$ that are caused by PFC input voltage vg and PFC output voltage $v_o$ are affected by different gains while the turn-off duty cycle control to average inductor current transfer function remains the same. Thus, current control in DCM can be achieved by using the same CCM feedback controller, and compensating the outputs of the feed forward controllers that are used to cancel off the disturbances caused by $v_g$ and $v_o$ on $i_L$ with the respective gains in CCM and DCM. The compensating factor, $(d+\Delta_1)$, is used to compensate the outputs of the feed forward controllers and the inductor current sample obtained by sampling in the middle of the switch turn-on time to obtain the average inductor current in DCM. In addition, the compensating factor provides an automatic transition between the PFC operations in CCM and DCM without the need for a separate conduction mode detection algorithm. In some embodiments, the respective feed forward controllers in CCM and DCM effectively cancel disturbances caused by $v_g$ and $v_o$ on $i_L$ in CCM and DCM, while the same feedback controller compensates for small values of the inductor current error. Thus, embodiments of the present invention may provide a required turn-off duty ratio that ensures good input current shaping in both CCM and DCM, leading to a lower total harmonic current distortion, higher power factor and higher efficiency. Fixed switching frequency may be implemented digitally.

FIG. 1 illustrates a power supply system 100 according to an embodiment of the present invention that may be used for medium and high power application. System 100 provides an output DC voltage $v_{o1}$ given an input AC voltage v, using two stages of power conversion: a power factor converter (PFC) 132 followed by second stage DC-DC converter 126 that provides power to load 130. As shown, power supply system 100 further includes a diode bridge rectifier with diodes 108, 110, 112, and 114 that converts input AC voltage $v_{in}$ to a rectified voltage $v_g$. In some embodiments a low pass filter represented by inductor 104 and capacitor 106 may be included to filter electromagnetic interference, as well as output capacitor 124 coupled to the output of second stage DC-DC converter 126.

Power factor converter 132 is illustrated as a boost converter having inductor 116, free wheeling diode 122, switching transistor 120, and output capacitor 124. During operation, switching transistor 120 is turned on, which causes a current $i_L$ to flow through inductor 116. Next, switching transistor 120 is turned off, thereby allowing current $i_L$ to flow though free wheeling diode 122 and charge capacitor 124. By using a control algorithm, switching transistor 120 may be operated in a manner that provides a regulated output voltage $v_o$, as well as a controlled average input current $iL_{avg}$. In some embodiments, the control algorithm is implemented digitally using a controller (not shown) that monitors output voltage $v_o$ and monitors an input current of PFC 132, for example, by monitoring the voltage across series resistor 118. When the control algorithm controls the average input current of the PFC such that the average input current is substantially in phase with input voltage vg, the power factor of system 100 may be enhanced. The power factor may be further enhanced by using a control algorithm that provides a more sinusoidal average current signal having a low harmonic distortion.

In medium to high power applications such as computer and server applications, the power supplies may be designed to meet efficiency and power factor requirements across a wide load range. These requirements may also include total harmonic current distortion requirements at high line and light load conditions. In one example requirement, the total harmonic current distortion is specified to be less than 5% given an input voltage of 230 VAC and 20% load.

It should be understood that the illustrated topology of PFC 132 is just one of many examples of embodiment PFC circuits. In alternative embodiments, PFC 132 may be implemented using boost converters, buck converters, buck-boost converters, or other topologies including both active and passive networks.

Second stage DC-DC converter 126 may be implemented, for example, using a flyback converter, forward converter, or resonance DC-DC converter. Alternatively, other topologies may be used depending on the particular application and its requirements.

Figure 2:
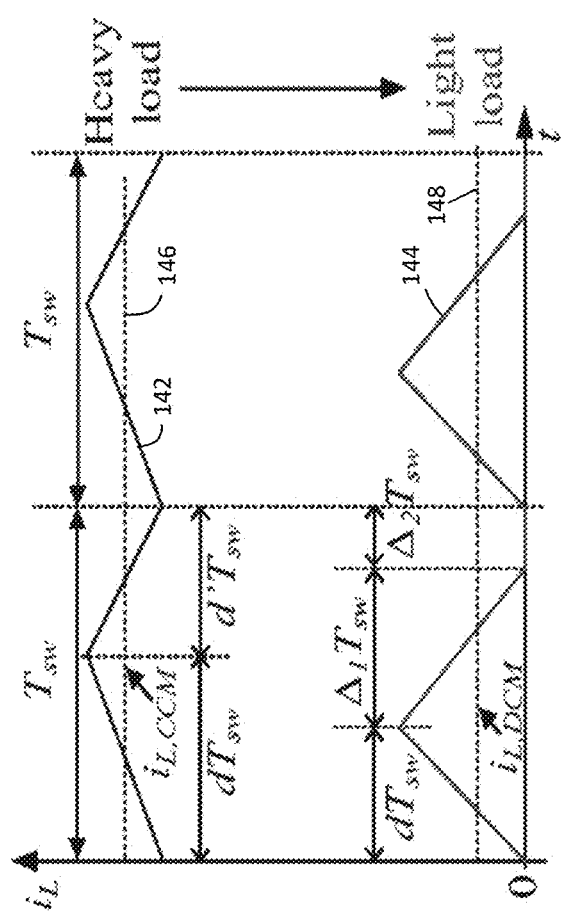
FIG. 2 illustrates a graph of current for a power factor converter (PFC) in continuous conduction mode (CCM) and discontinuous conduction mode (DCM)

FIG. 2 shows waveform diagrams of inductor current $i_L$ that illustrate a couple of conduction modes under which PFC 132 may operate. Curve 142 represents inductor current $i_L$ for continuous conduction mode (CCM), and line 146 represents the average inductor current $iL_{CCM}$ for the CCM mode. During period $dT_{sw}$, switching transistor 120 is switched on and inductor current $i_L$ increases, while during period $d'T_{sw}$, switching transistor 120 is switched off and inductor current $i_L$ decreases, wherein d represents the turn-on duty cycle and $T_{sw}$ represents the switching period. As shown, current $i_L$ is positive during CCM such that inductor 116 is either charging or discharging. The special case in which inductor current reaches zero only at the boundary of a switching interval is known in critical conduction mode (CRM). In embodiments of the present invention, PFC 132 operates in CCM under heavy load conditions that require higher average currents.

Under light load conditions, however, PFC may be configured to output a lower output current by operating in discontinuous conductions mode (DCM). Curve 144 represents inductor current $i_L$ for discontinuous conduction mode (DCM), and line 148 represents the average inductor current $iL_{DCM}$ for the DCM mode. During period $dT_{sw}$, switching transistor 120 is switched on and inductor current $i_L$ increases, while during period $\Delta_1 T_{sw}$, switching transistor 120 is switched off and inductor current $i_L$ decreases to zero, where $\Delta_1$ represents the fraction of the switching period that inductor current decreases. Next, during $\Delta_2 T_{sw}$, switching transistor 120 remains off and inductor current $i_L$ is zero, where $\Delta_2$ represents the faction of the switching period that the inductor current is zero.

For power supplies in medium to high power applications that are above 200 W, PFCs are typically designed to operate in CCM to reduce losses under heavy load conditions. Under lightly loaded conditions, however, PFCs may be prone to higher total harmonic current distortion, lower power factor and lower efficiency due to nonlinear converter characteristics in DCM. In embodiments of the present invention, a current controller that includes feed forward control paths in an average current control loop is used to provide good input shaping in both CCM and DCM modes, thereby achieving an average current signal having a low harmonic distortion and a high power factor.

Figure 3:
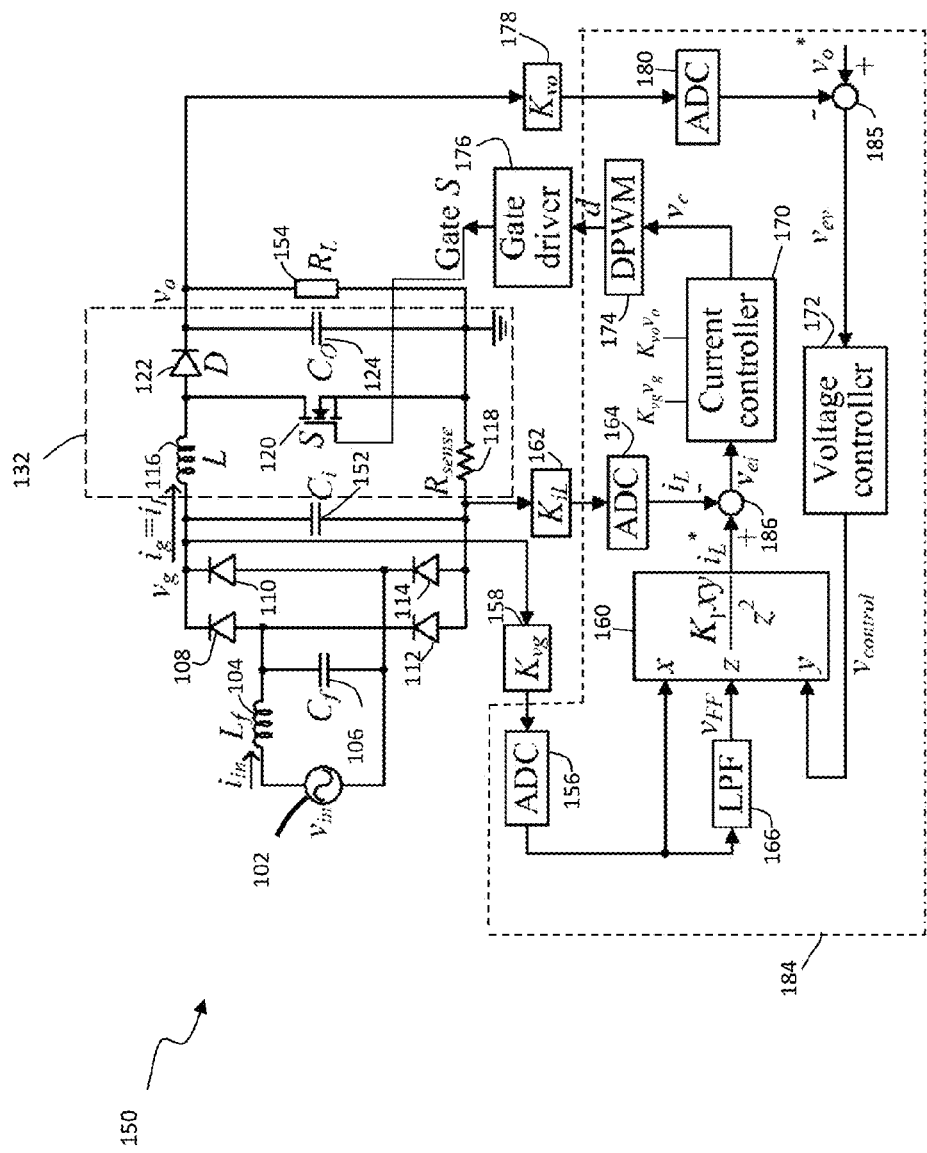
FIG. 3 illustrates an embodiment switched mode power supply with a controller.

FIG. 3 illustrates embodiment power supply system 150 that includes PFC 132 coupled to a load represented by resistor 154, to embodiment controller 184, and to gate driver 176 that provides drive signal Gate S to the gate of switching transistor 120. Depending on the particular platform or controller architecture, gate driver 176 may be integrated within controller 184 or a separate external gate driver may be used. In an embodiment, controller 184 produces pulse width modulated signal d based on feedback from measurements of PFC input voltage $v_g$, sensed inductor current iL, and PFC output voltage $v_o$.

As shown, controller 184 is implemented as a digital controller having analog to digital converters (ADCs) 156, 164 and 180 that convert measurements of PFC input voltage $v_g$, sensed inductor current iL, and PFC output voltage $v_o$, respectively, from the analog domain to the digital domain. In embodiments, ADCs 156, 164 and 180 may be implemented using various analog to digital converter circuits and systems known in the art, for example, successive approximation ADCs, flash ADCs, and the like. In some embodiments, ADCs 156, 164 and 180 may be implemented using a single ADC with a multiplexed input. Interface blocks 158, 162 and 178 are denoted with gains $K_{vg}$, $K_{iL}$ and $K_{vo}$, respectively, which represent the gain or attenuation from the measured node to the input of respective ADCs 156, 164 and 180. Voltage interface blocks 158 and 178 may be implemented, for example, using a resistive voltage divider, and current measurement interface block 162 may include circuitry, for example a differential amplifier, that determines the voltage across resistor $R_{sense}$. In such an embodiment gains $K_{vg}$, $K_{vo}$ may represent the voltage divider ratios and gain $K_{iL}$ may represent the product of gain of the interface amplifier with resistance $R_{sense}$. It should be understood that these are only examples of measurement interfaces, and that many different measurement interfaces known in the art may be used.

In an embodiment, controller 184 essentially implements two control loops: a voltage control loop configured to regulate the output voltage of PFC 132 and a current control loop configured to control the average current of inductor current $i_L$. The inner current controller 170 ensures that that the average inductor current $i_L$ follows a rectified sinusoidal reference current $i_L^*$ that is generated by multiplying the output of the outer voltage controller 172 with a rectified sinusoidal waveform obtained from the AC input voltage $v_g$. With input voltage feed forward, the output voltage $v_o$ becomes independent of the AC input voltage variations.

As shown, the outer voltage control loop includes subtractor 185 that produces voltage error signals $v_o$ by subtracting the output of ADC 180 representing the measured output voltage from a signal $v_o^*$ that represents the desired output voltage of PFC or a fraction thereof. Voltage controller 172 provides control signal $v_{control}$ to multiplier 160 that essentially scales a desired current signal by $v_{control}$ representing the error signal of the voltage control loop. Voltage controller 172 may implement control algorithms known in the art to provide control of output voltage $v_o$.

In an embodiment, rectified sinusoidal reference current iL* is generated by multiplying the output of ADC 156, which represents the instantaneous input voltage $v_g$, with $v_{control}$ and dividing by $v_{FF}^2$, where $v_{FF}$ represents an averaged value of input voltage $v_g$. In the event that the amplitude of the AC input voltage is doubled at the same output power, $v_{FF}$ will also be doubled and the rectified sinusoidal reference current iL* will be halved. This division keeps the output voltage unchanged at the same output power under a change of the AC input voltage, thereby making the output voltage less sensitive to variations in the AC input voltage. As shown, $v_{FF}$ is generated by low pass filtering the output of ADC 156 using low pass filter block 166. As shown, multiplier block implements the following equation:

$$\frac{K_1 xy}{z^2},$$

where $K_1$ is a multiplication constant, x represents the instantaneous input voltage $v_g$, y represents voltage controller output $v_{control}$, and z represents the averaged value of input voltage $v_g$. Subtractor 186 subtracts the output of ADC 164 that represents the measured average inductor current $i_L$ from rectified sinusoidal reference current $i_L^*$ to produce current error signal $v_{ei}$ and current controller 170 produces control signal $v_c$ based on current error signal $v_{ei}$. Finally, digital pulse width modulator (DPWM) 174 produces the duty cycle signal d from $v_c$, which is fed to gate driver 176, which drives gate S at the modulated frequency. Current controller 170 also has $K_{vg}v_g$ and $K_{vo}v_o$ as inputs for feed forward control, which will be explained below.

Figure 4:
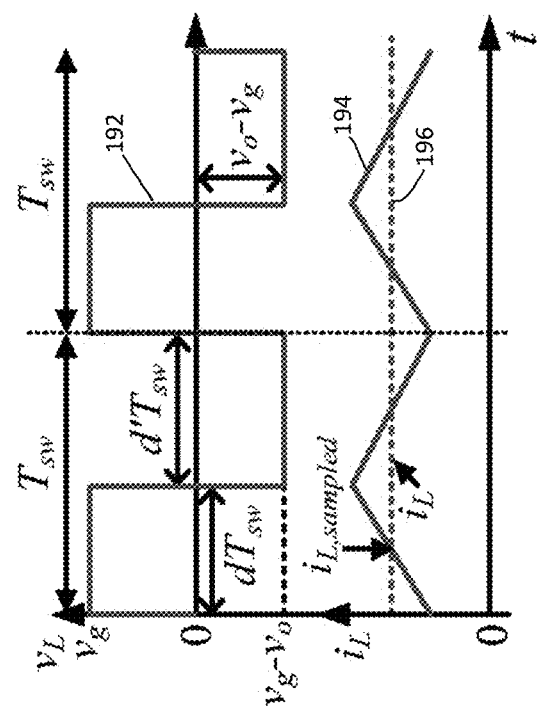
FIG. 4 illustrates inductor voltage and current waveforms for a PFC in CCM.
Figure 5:
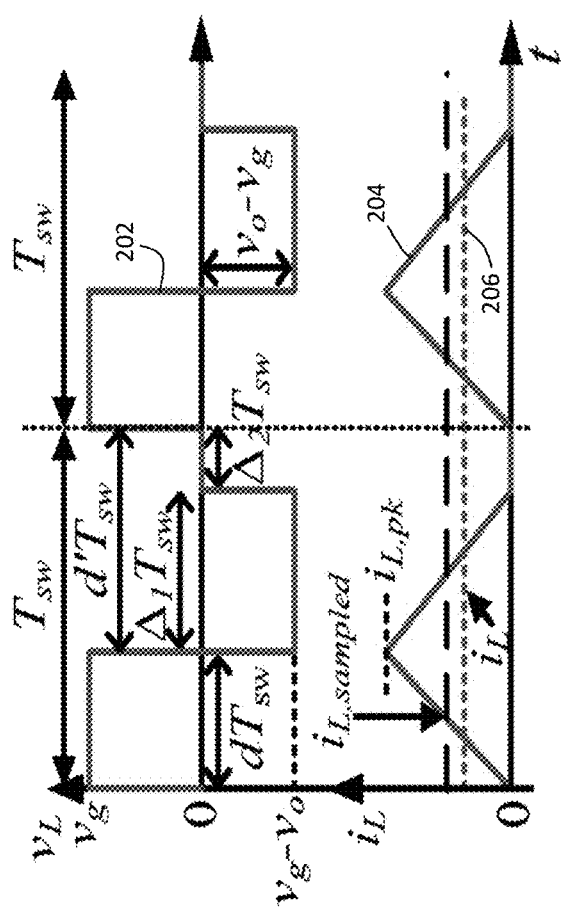
FIG. 5 illustrates inductor voltage and current waveforms for a PFC in DCM.

In an embodiment, the ability of the controller to track the average inductor current inductor current $i_L$ in both the CCM and the DCM modes is enhanced by applying feed forward control with respect to input voltage PFC input voltage $v_g$ and with respect to PFC output voltage $v_o$ within the current controller 170. The nomenclature used in the derivation and description of embodiment current controllers is shown in FIGS. 4 and 5 that illustrate waveform diagrams showing the relationship in between inductor voltage $v_L$ and inductor current $i_L$ for CCM and DCM, respectively. I In FIG. 4, with respect to CCM operation, curve 192 represents the inductor voltage $v_L$, curve 194 represents the inductor current $i_L$, and curve 196 represents the average inductor current $i_L$. $i_{L,sampled}$ is the inductor current sample that is sampled in the middle of the switch turn-on time. As shown, during CCM mode, inductor voltage $v_L$ is set to $v_g$ during time period $dT_{sw}$ when inductor current $i_L$ is increasing and set to $v_g - v_o$ during time period $dT_{sw}$ when inductor current $i_L$ is decreasing. As mentioned above, d represents the turn-on duty cycle and d' represents the turn-off duty cycle.

In FIG. 5, with respect to DCM operation, curve 202 represents the inductor voltage $v_L$, curve 204 represents the inductor current $i_L$, and curve 206 represents the average inductor current $i_L$. $i_{L,sampled}$ is the inductor current sample that is sampled in the middle of the switch turn-on time. As shown, during DCM mode, inductor voltage $v_L$ is set to $v_g$ during time period $dT_{sw}$ when inductor current $i_L$ is increasing, set to $v_g - v_o$ during time period $\Delta_1 T_{sw}$ when inductor current $i_L$ is decreasing, and set to about zero when inductor current $i_L$ is zero. As mentioned above, $\Delta_1$ represents the fraction of the switching period $T_{sw}$ that inductor current decreases, and $\Delta_2$ represents the faction of the switching period $T_{sw}$ that the inductor current is zero.

An averaged small signal model is used to model the boost PFC in CCM and DCM for the inner current control loop design. From the inductor voltage and current, the average inductor voltage of the boost PFC in CCM during a switching period $T_{SW}$ is:

$$L\frac{di_L}{dt} = v_g d + (v_g - v_o)d' = v_g + v_o(0) - d'V_o, \qquad (1)$$

where d is the turn-on duty cycle, d' is the turn off duty cycle, and d+d'=1, $V_o$ is the DC component of PFC output voltage $v_o$. $v_o$ comprises of DC component $V_o$ and small AC variation $\widehat{v_o}$, where $V_o \gg \widehat{v_o}$. The term $d'\widehat{v_o}$ is ignored in equation (1) because it is significantly smaller in magnitude as compared to $d'V_o$. Likewise, the average inductor voltage of the boost PFC in DCM during a switching period $T_{SW}$ is given by:

$$L\frac{di_L}{dt} = v_g d + (v_g - v_o)\Delta_1 + (0)\Delta_2 \quad (2)$$
$$= v_g(d + \Delta_1) + v_o\Delta_2 - v_o\Delta_2 - v_o\Delta_1,$$
$$= v_g(d + \Delta_1) + v_o(1 - (d + \Delta_1)) - d'V_o,$$

where $d'=1-d=\Delta_1+\Delta_2$.

Comparing equations (1) and (2), the disturbances caused by $v_g$ and $v_o$ on $i_L$ in CCM and DCM are affected by different gains while the turn-off duty ratio $d'$ to average inductor current $i_L$ transfer function remains the same. Thus, in embodiments of the present invention, DCM current control is achieved by keeping the same CCM feedback controller, and compensating the outputs of the feed forward controllers that cancel off the disturbances caused by $v_g$ and $v_o$ on $i_L$ with the respective gains. The turn-off duty ratio to average inductor current transfer function that is used for designing the feedback controller is given by $$\frac{i_L(s)}{d'(s)} = -\frac{V_o}{sL}. \quad (3)$$

Figure 6:
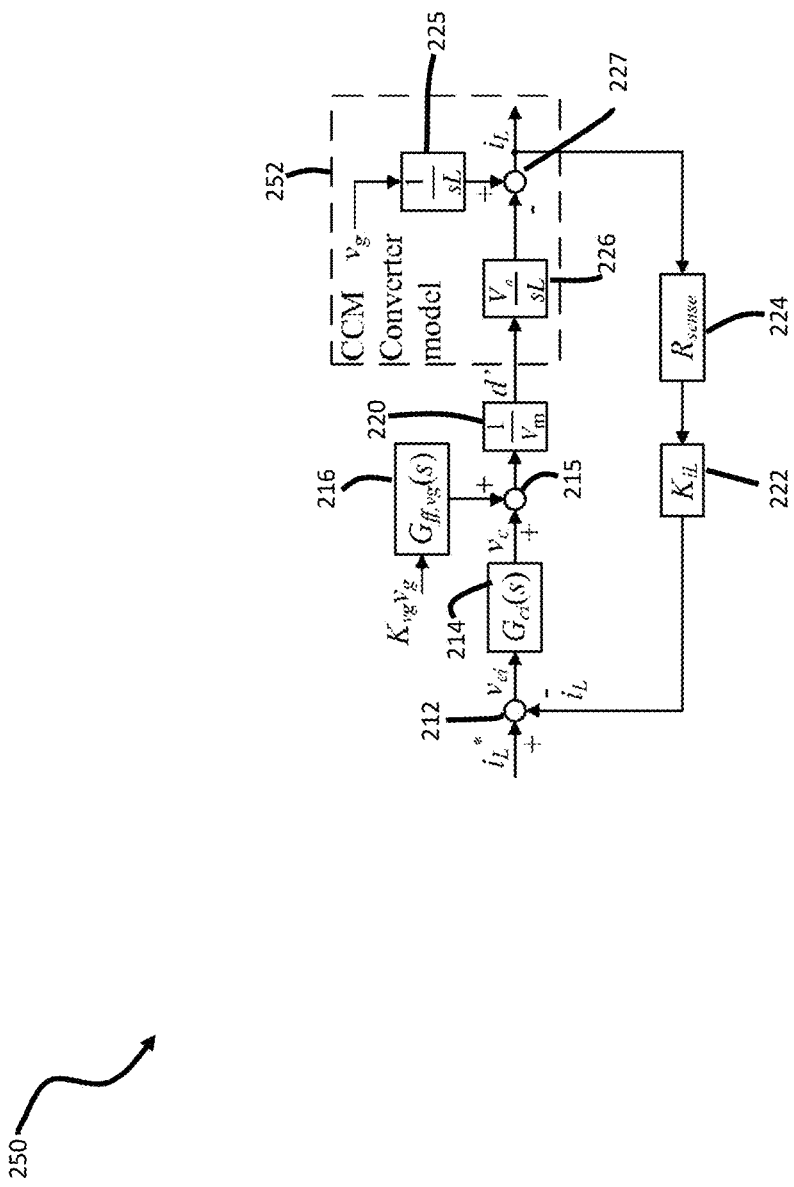
FIG. 6 illustrates a current control loop in CCM according to an embodiment.
Figure 7:
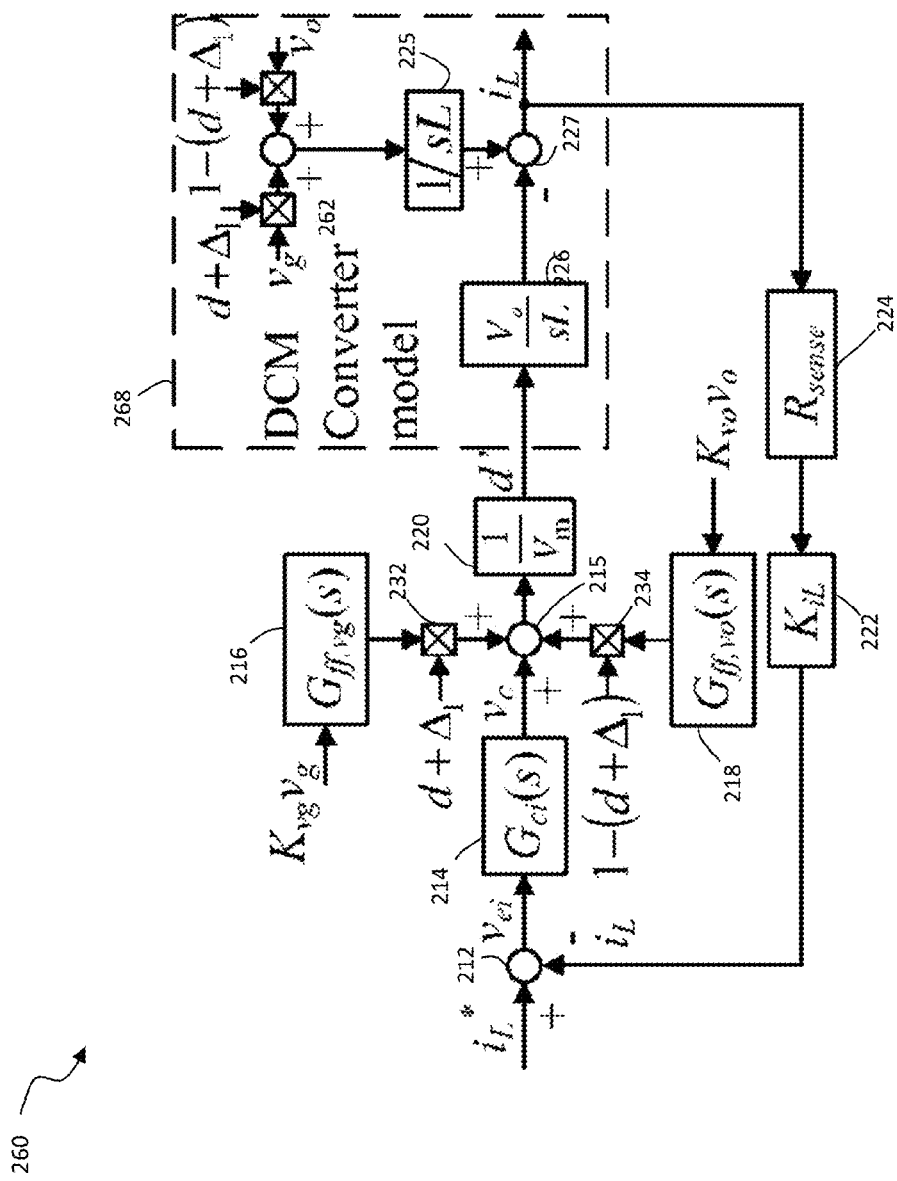
FIG. 7 illustrates a current control loop in DCM according to an embodiment.

FIGS. 6 and 7 illustrate blocks diagrams of embodiment inner current control loops in CCM and in DCM, respectively. CCM inner current control loop 250 shown in FIG. 6 includes current controller 214 having transfer function $G_{ci}(s)$ that operates on current error signal $v_{ei}$ and produces control signal $v_c$, and feed forward controller 216 having transfer function $G_{ff,vg}(s)$ that operates on scaled PFC input voltage $K_{vg}v_g$. As illustrated, there is no feed forward path for PFC output voltage $v_o$ because the $v_o$ term in equation (1) is zero.

The outputs of current controller 214 and feed forward controller 216 are summed together using summer 215 and applied to the PFC converter, which is modeled by CCM converter model 252. Attenuation block 220 represents pulsewidth modulation (PWM) function, which converts the control voltage at output of summer 215 into pulsewidth signal that gives the desired $d'$ for driving the gate of the switching transistor. $V_m$ is the peak value of the pulsewidth modulation signal. Symmetrical PWM employing a triangular waveform or asymmetrical PWM employing a sawtooth waveform may be used in some embodiments. As shown, CCM converter model includes dynamic blocks 225 and 226 and summer 227. It should be understood that these blocks represent a linear model of the PFC that may be used for simulation and analysis. Accordingly, the effect of sense resistor $R_{sense}$ is modeled by block 224, and the effect of the current sense to controller interface is represented by gain $K_{iL}$ in block 222. It should be understood that the environment in which embodiment CCM current controllers operate differ over varying embodiments and may be modeled differently from what is depicted in FIG. 6.

DCM inner current control loop 260 shown in FIG. 7 is similar to CCM control loop 250 of Figure with the addition of feed forward controller 218 having transfer function $G_{ff,vo}(s)$ that operates on scaled PFC output voltage $K_o v_o$. In addition, compensation factor $d+\Delta_1$ is applied to feed forward controller 216 via multiplier 232, compensation factor $1-(d+\Delta_1)$ applied to feed forward controller 218, and DCM converter model 268 models the effect of DCM operation on the system by applying scaling factor $d+\Delta_1$ to $v_g$ and applying scaling factor $1-(d+\Delta_1)$ to $v_o$.

It can be seen that in the embodiment DCM current control structure of FIG. 7, minimal changes are made with respect to the CCM control structure of FIG. 6. For example, as shown, the feed forward controller 216 is scaled by a factor $d+\Delta_1$. Since d represents the portion of the switching cycle in which inductor current $i_L$ increases and $\Delta_1$ represents the portion of the switching cycle in which the inductor current decreases, in CCM, $(d+\Delta_1)=1$, which is equivalent to using the unscaled output of feed forward controller 216 in the CCM controller depicted in FIG. 6. In DCM, however, $(d+\Delta_1)<1$ because the inductor current $i_L$ is zero during a portion of the switching cycle. Therefore, multiplying the output of feed forward controller 216 by compensating factor $(d+\Delta_1)$ provides an automatic transition between the CCM converter characteristic in (1) and the DCM converter characteristic in (2) without the need for a separate conduction mode detection algorithm.

In an embodiment, respective feed forward controllers 216 and 218 may be configured to cancel disturbances caused by $v_g$ and $v_o$ on $i_L$ in both CCM and DCM, while the CCM feedback current controller 214 compensates for small values of the inductor current error. In an embodiment, the combination of controllers 214, 216 and 218, when operating in the control loop, produce requisite turn-off duty ratio $d'$ that ensures good input current shaping in both CCM and DCM operations of the boost PFC.

In accordance with an alternative embodiment of the present invention, the factor $d+\Delta_1$ may be derived from the peak inductor current $i_{L,pk}$ in DCM. The peak inductor current is given by:

$$i_{L,pk} = \frac{v_g d T_{sw}}{L} = \frac{(v_o - v_g)\Delta_1 T_{sw}}{L}. \quad (4)$$

By rearranging equation (4), $$d + \Delta_1 = \frac{dv_o}{(v_o - v_g)}, \quad (5)$$

where d is the turn-on duty cycle given by $1-d'$, $v_o$ is the output voltage, and $v_g$ is the rectified input voltage. The average inductor current in CCM can be obtained by sampling in the middle of the switch turn-on time. The average inductor current in DCM is:

$$i_L = \frac{1}{2}i_{L,pk}(d + \Delta_1) = i_{L,sampled}(d + \Delta_1). \quad (6)$$

Thus, the same factor $d+\Delta_1$ can be used to compensate the inductor current sample obtained by sampling in the middle of the switch turn-on time to obtain the average inductor current in DCM in some embodiments.

Figure 8:
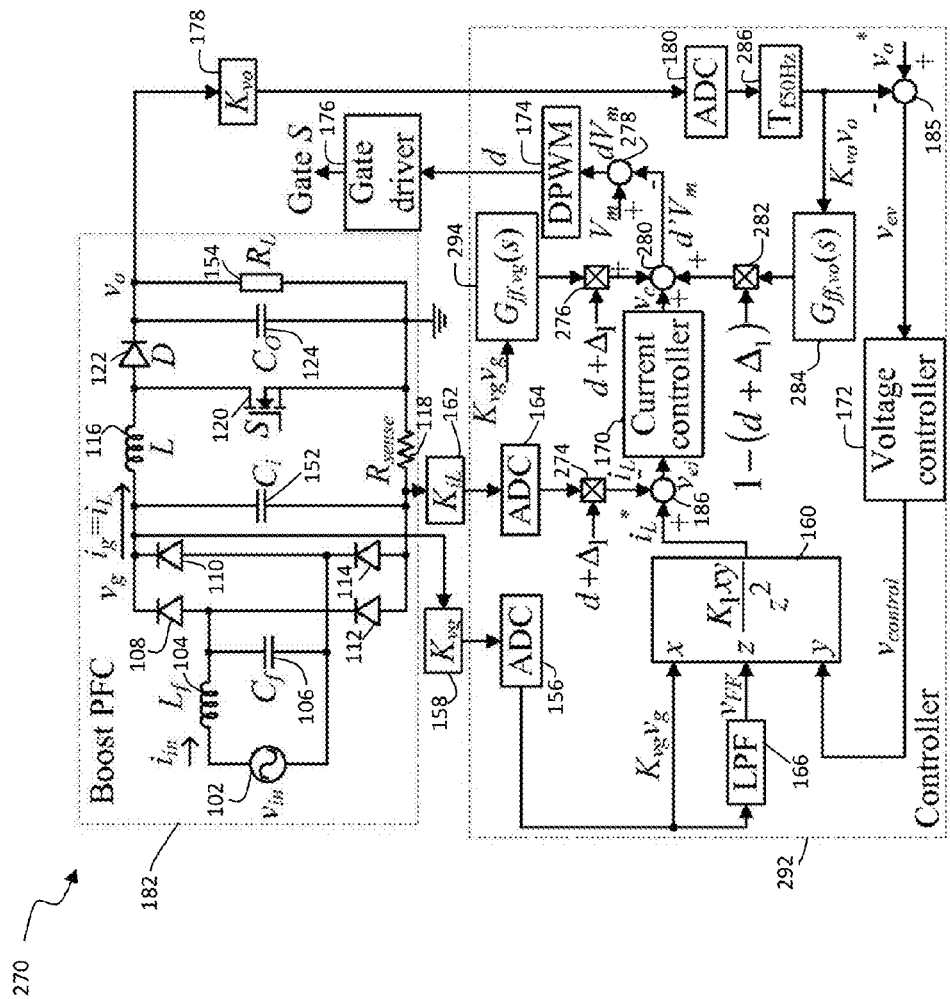
FIG. 8 illustrates an embodiment control block diagram of a power factor converter (PFC)

FIG. 8 illustrates a block diagram of power supply system 270 including PFC 182 coupled to controller 292 in accordance with an embodiment of the present invention. Controller 292 is similar to controller 150 illustrated in FIG. 3 with the addition of feed forward controller 294 that applies transfer function $G_{ff,vg}(s)$ to $K_{vg}v_g$, and feed forward controller 284 that applies transfer function $G_{ff,vo}(s)$ to $K_{vo}v_o$. The output of feed forward controller 294 is scaled by factor $(d+\Delta_1)$ via multiplier 276, and the output of feed forward controller 284 is scaled by factor $1-(d+\Delta_1)$ via multiplier 282, the outputs of which are summed with the output of current controller 170 via summer 280 to produce a control voltage d' Vm where the turn-off duty signal d' is scaled by a factor Vm. Factor $V_m$ is summed with the control voltage d' Vm in order to produce a control voltage dVm where the turn-on duty cycle signal d is scaled by the factor Vm, where Vm is the peak value of the digital pulsewidth modulation signal (DPWM). The pulsewidth modulation function is modeled as 1/Vm as shown in FIG. 6 and FIG. 7. The pulsewidth modulation module generates pulsewidth signals with turn-on duty cycle d, which, in turn, are sent to the gate driver circuitry for driving the gate of the switching transistor S. In addition, the outputs of ADC 164 used to digitize measurements of inductor current $i_L$ is scaled by $(d+\Delta_1)$ by multiplier 274.

Controller 292 further includes low pass filter 286 that filters out the 100 Hz (for 50 Hz line frequency) or 120 Hz (for 60 Hz line frequency) ripple in the output voltage signal and provides a relatively constant output voltage value. In an embodiment, low pass filter 286 prevents voltage ripple from being directly applied to the voltage controller, being passed on to the reference inductor current to and cause higher distortion in the input current. Low pass filter 286 may be implemented using a first order low pass filter, a notch filter, a deadzone controller or other topologies known in the art.

In an embodiment, low pass filter 166 is used to produce an equivalent DC value $v_{FF}$ from the sensed rectified line voltage $v_{gs}K_{vg}v_g$. Input voltage feed forward of the term $v_{FF}$ in the multiplier block allows stable reference inductor current $i_L^*$ to be generated when the AC input voltage changes and makes the DC output voltage less sensitive to variations in the AC input voltage. For example, if the amplitude of the input voltage were to be doubled for the same output power, the amplitude of $v_{FF}$ would be doubled and cause the amplitude of the reference inductor current $i_L^*$ to be halved. By using the output of low pass filter 166 to inversely scale the sensed rectified line voltage $v_{gs}=K_{vg}v_g$, reference inductor current $i_L^*$ may be made insensitive to input amplitude variation.

A suitable low pass filter transfer function may be selected for filter 166 depending on the transient response requirement of power supply system 270. In embodiments in which there are no stringent output voltage regulation limits required by the application for the PFC stage, a fast transient response to changes in the input voltage may not be required and a first order low pass filter may be used. In embodiment applications needing a tightly regulated output voltage in the PFC stage, the filter 166 may be specified to provide a fast transient response to changes in the input voltage. In such embodiments, a two-stage low pass filter with two cascaded poles can be used, for example. In alternative embodiments, other transfer functions and filter types may be utilized for filter 166 to provide suitable responses.

In an embodiment, the power stage of the boost PFC may modeled using a loss free resistor (LFR) model with respect to the design of voltage controller 172. In two stage power supplies, the downstream DC-DC converter appears like a constant power load to the front stage PFC. For constant power load and average current control with input voltage feed forward, the control v control to output voltage $v_o$ transfer function is given by:

$$\frac{v_o(s)}{v_{control}(s)} = \frac{P_{av}}{V_o V_{control}} \frac{1+sC_o R_{esr}}{sC_o} \quad (7)$$

where $R_{esr}$ is the parasitic series resistance of the output capacitor $C_o$.

Figure 9:
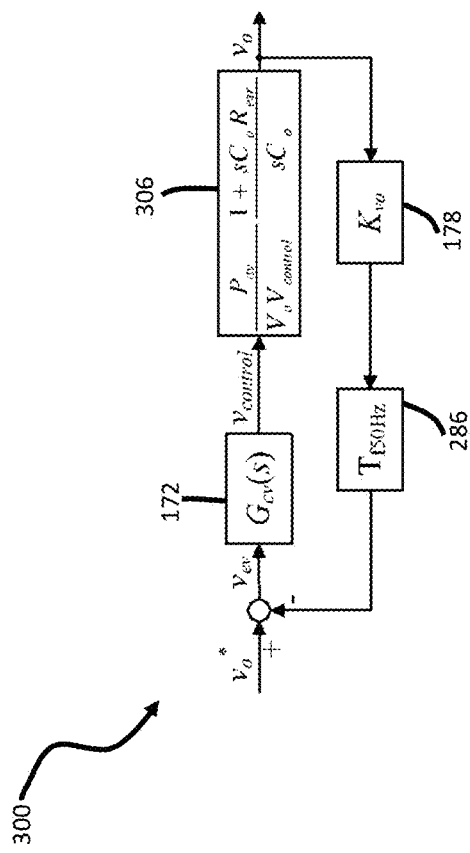
FIG. 9 illustrates a block diagram of an embodiment voltage control loop for a PFC.

An output voltage control block diagram 300 is illustrated in FIG. 9, which shows voltage controller block 172 coupled to block 306 that represents the control to output voltage transfer function of equation (7) in the forward path. The feedback path is modeled by $K_{vo}$ in block 178 that represents the gain or attenuation from the sensed output voltage $v_o$ to the controller, and low pass filter 286.

In an embodiment, voltage controller 172 may be implemented using a PI (proportional-integral) controller, PID (proportional-integral-derivative) controller or any other suitable feedback control schemes can be used for the output voltage controller $G_{cv}(s)$. The role of the voltage controller is to regulate the output voltage $v_o$ at the desired reference output voltage value $v_o^*$. The output of the voltage controller $V_{control}$ is proportional to output power $P_{av}$.

In an embodiment, constant $K_1$ is determined for multiplier block 160 that generates the reference inductor current for the current control loop. Constant $K_1$ allows adjustment of proportionality between $i_L^*$ and $i_L$ so that the output power $P_{av}$ is directly controlled by the output of the voltage controller $v_{control}$ as shown in equation (7) above. In average current control with input voltage feed forward, $K_1$ is derived as $$K_1 = \frac{i_g(t) R_{sense} K_{iL}}{\frac{K_{vg} v_g(t) v_{control}}{v_{FF}^2}} \quad (8)$$

Since $i_L^*$ is amplitude modulated by $v_{control}$, constant $K_1$ may be evaluated at full load and an input voltage of RMS value $V_{g,rms}$ with the corresponding peak values computed for $v_g(t)$ and $i_g(t)$. Moreover, $v_{FF}$ may be computed or obtained from simulation for the input voltage of RMS value $V_{g,rms}$. From equation (7), the output of the voltage controller $v_{control}$ is proportional to output power $P_{av}$. Thus, the full load power may be represented by a $V_{control}$ value. With the other circuit parameters, $R_{sense}$, $K_{iL}$ and $K_{vg}$, $K_1$ can be computed. The $$\frac{1}{v_{FF}^2}$$

term in the multiplier is implemented using a lookup table for fast computation in some embodiments as shown with respect to lookup table block 502 in FIG. 19a.

From the converter characteristics in CCM as shown in equation (1), the inductor current $i_L$ is influenced by the turn-off duty cycle d' and by the disturbance caused by the input voltage $v_g$ in each switching cycle. From the converter characteristics in DCM as shown in equation (2), the inductor current $i_L$ is influenced by the turn-off duty cycle d' and the disturbances caused by the input voltage $v_g$ as well as output voltage $v_o$ in each switching cycle. Feed forward controllers, $G_{ff,vg}(s)$ and $G_{ff,vo}(s)$, are used to offset the disturbances caused by $v_g$ and $v_o$ on $i_L$ respectively. The transfer functions of the feed forward controllers may be obtained by computing the gains along the current control loop:

$$G_{ff,vg} = \frac{V_m}{K_{vg}V_o} \qquad (9)$$

$$G_{ff,vo} = \frac{V_m}{K_{vo}V_o} \qquad (10)$$

Asymmetrical PWM employing a periodic saw tooth ramp or a symmetrical PWM employing a periodic triangular waveform with a peak value of $V_m$ can be used to generate the turn-off duty ratio by comparing with the control signal formed by the sum of the outputs of feedback current controller and the feed forward current controllers.

A PI controller, PID controller, or other suitable feedback control scheme may be used for current controller $G_{ci}(s)$. The role of the current controller is to ensure that the average inductor current $i_L$ tracks the reference inductor current $i_L^*$.

DCM current control may be achieved by keeping the same CCM feedback controller, and compensating the outputs of the feed forward controllers, $G_{ff,vg}(s)$ and $G_{ff,vo}(s)$, with the factors $(d+\Delta_1)$ and $1-(d+\Delta_1)$, respectively, where $(d+\Delta_1)<1$ in DCM. To obtain accurate average inductor current in DCM, the inductor current sample obtained by sampling in the middle of the switch turn-on time may also be compensated with the factor $(d+\Delta_1)$. The factor $(d+4_1)$ may be computed from equation (5) above and rewritten as:

$$d + \Delta_1 = \frac{dv_o}{(v_o - v_g)} = d \times v_o \times \frac{1}{(v_o - v_g)}. \qquad (11)$$

The division $1/(v_o-v_g)$ may be implemented using a lookup table for faster computation as shown with respect to lookup table block 504 in FIG. 19b. Alternatively, factor $(d+\Delta_1)$ may be computed.

Embodiments of the present invention may further incorporate circuits, system and method described in the paper by Shu Fan Lim and Ashwin M Khambadkone, entitled "A Simple Digital DCM Control Scheme for Boost PFC Operating in Both CCM and DCM," IEEE Trans. Ind. Appl., Vol. 47, No. 4, pp. 1802-1812, July/August 2011, (hereinafter, "Lim") which is incorporated herein by reference in its entirety. Lim describes a control scheme based on average current control using turn-on duty cycle control rather than turn-off duty cycle control as described in embodiment herein.

To illustrate differences between the embodiments of the present invention and the control scheme in Lim, the control scheme in Lim is summarized here. From FIG. 4, the average inductor voltage of the boost PFC in CCM during a switching period $T_{sw}$ is given by $$L\frac{di_L}{dt} = v_g d + (v_g - v_o)d' = v_g - v_o(1-d) = v_g - v_o + dV_o \qquad (12)$$

From FIG. 5, the average inductor voltage of the boost PFC in DCM during a switching period $T_{sw}$ is given by $$\begin{aligned} L\frac{di_L}{dt} &= v_g d + (v_g - v_o)\Delta_1 + (0)\Delta_2 \\ &= v_g(d + \Delta_1) + v_o d - v_o d - v_o \Delta_1 \\ &= v_g(d + \Delta_1) - v_o(d + \Delta_1) + dV_o \end{aligned} \qquad (13)$$

Comparing equations (12) and (13), the disturbances caused by $v_g$ and $v_o$ on $i_L$ in DCM are affected by the factor $(d+\Delta_1)$, while the turn-on duty ratio d to average inductor current $i_L$ transfer function remains the same. Thus, in Lim, DCM current control is achieved by keeping the same CCM feedback controller, and compensating the outputs of the feed forward controllers that cancel off the disturbances caused by $v_g$ and $v_o$ on $i_L$ with the factor $(d+\Delta_1)$. The turn-on duty ratio to average inductor current transfer function that is used for the current controller design is given by $$\frac{i_L(s)}{d(s)} = \frac{V_o}{sL} \qquad (14)$$

Figure 11:
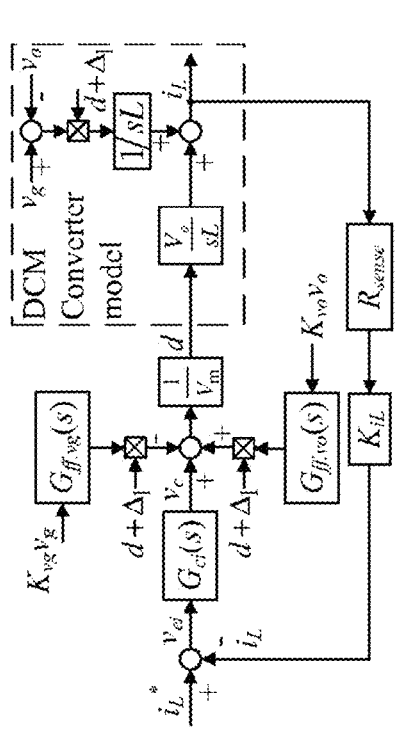
FIG. 11 illustrates a prior art DCM current control loop.
Figure 10:
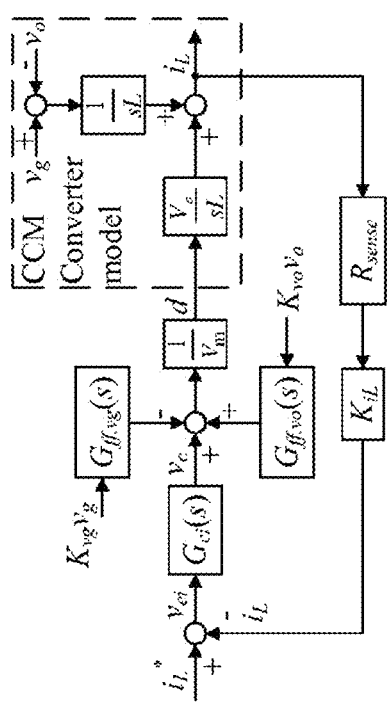
FIG. 10 illustrates a prior art CCM current control loop.

FIGS. 10 and 11 illustrate block diagrams of the inner current control loop in CCM and DCM respectively with the control scheme in Lim. Comparing the small signal models used in embodiments given by equations (1) and (2) and the small signal models used in Lim given by equations (12) and (13), the disturbances caused by $v_g$ and $v_o$ on $i_L$ in CCM and DCM are affected by different gains. This is because embodiments described herein are derived from the averaged small signal model of the boost converter with turn-off duty cycle control, whereas the control scheme in Lim is derived from the averaged small signal model of the boost converter with turn-on duty cycle control. Accordingly, Lim's control scheme has one more feed forward controller in CCM than in the embodiments described herein. In addition, embodiment current controllers used are designed based on the transfer function in equation (3), whereas the current controllers described in Lim are designed based on the transfer function in equation (14).

These differences in transfer functions result in different coefficients for the current controllers with respect to Lim and with respect to embodiments of the present invention. For example, in some embodiments, because the feed forward current controller that operates on output voltage $v_o$ has a coefficient of zero, calculations for this block may be disabled in CCM. By disabling such calculations, the maximum operating frequency in CCM mode may be increased due to there being fewer operations that need to be calculated.

Figure 12:
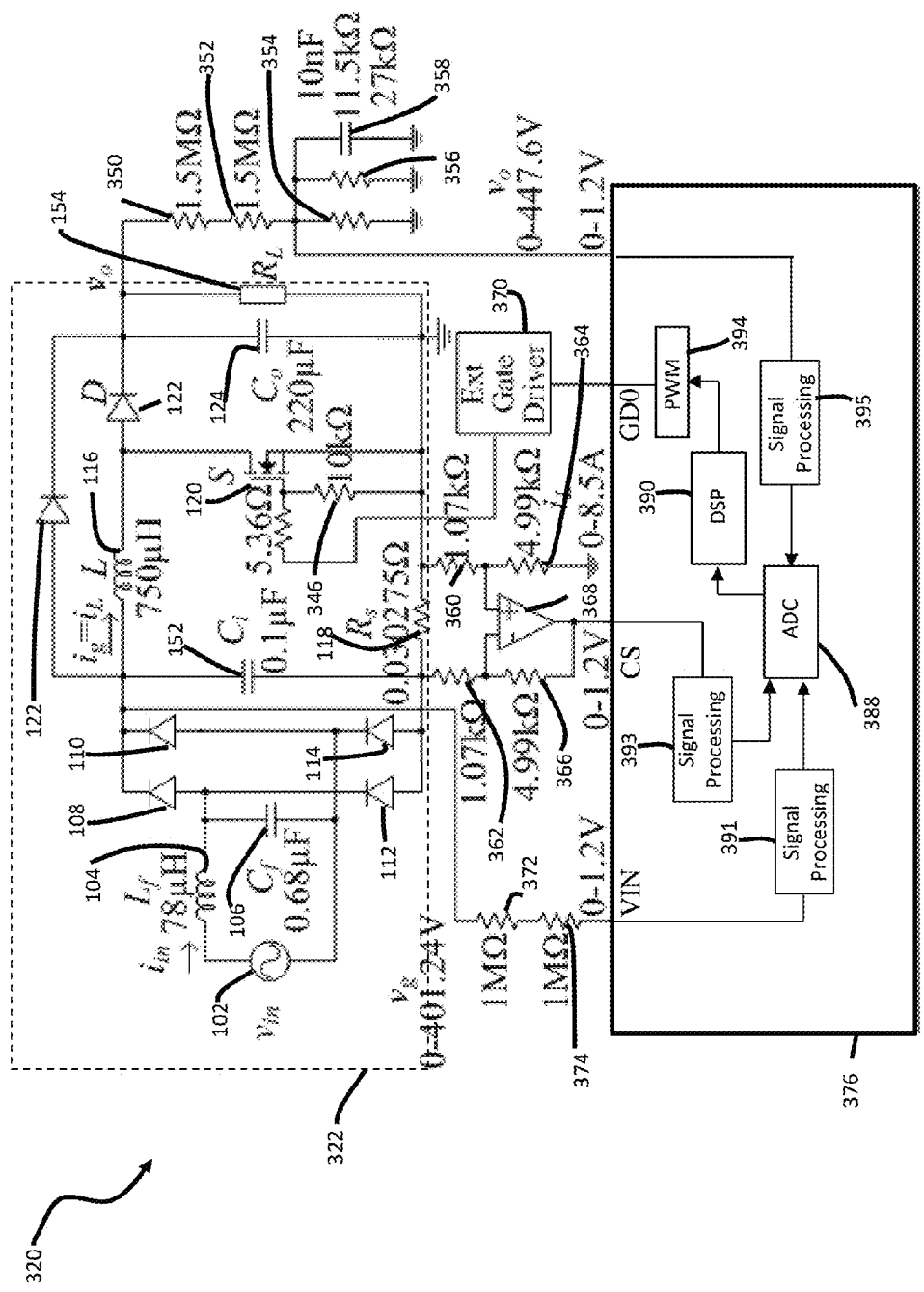
FIG. 12 illustrates a schematic of an embodiment switched mode power supply.

In embodiments of the present invention, a power supply controller may be implemented in a general purpose processor or an application specific integrated circuit (ASIC). The computation may be implemented in firmware, software, or hardware. FIG. 12 illustrates an embodiment power converter 320 using a DSP based controller 376. In an embodiment PFC 322 is coupled to controller via external gate driver 370 that provides a gate drive signal for switching transistor 120 and a differential amplifier circuit that includes amplifier 368, and resistors 360, 362, 364 and 366, which is used for sensing inductor current via current sensing resistor 118. Input voltage $v_g$ is sensed via a resistor divider including external resistors 372 and 374 and an additional resistance internal to controller 376. Output voltage $v_o$ is sensed using a low pass sensing network that includes external resistors 350, 352, 352 and 356 and external capacitor 358.

In an embodiment, digital signal processor (DSP) 390 performs embodiment power supply control algorithms described herein based on measured input conversion by ADC 388. ADC 388 performs a multiplexed conversion of the input voltage $v_g$, the output of external amplifier 368 that provides a current measurement signal, and to divided sensed output voltage $v_o$. Pulsewidth Modulator (PWM) 394 performs the pulsewidth modulation function to generate pulsewidth signals with the required turn-on duty cycle d, where d=1−d'. In some embodiments, signal processing blocks 391, 393 and 395 may perform signal conditioning prior to ADC 388.

It should be appreciated that the embodiment shown in FIG. 12 is just one of many example implementations of embodiments of the present invention. In alternative embodiments, different controller architectures may be used and the partitioning between external devices and devices integrated within controller 376 may be different. For example, in some embodiments, gate driver 370 may be implemented within controller 376, as well as some of the sensing circuitry for input voltage $v_g$, output voltage $v_o$ and inductor current $i_L$.

Figure 13:
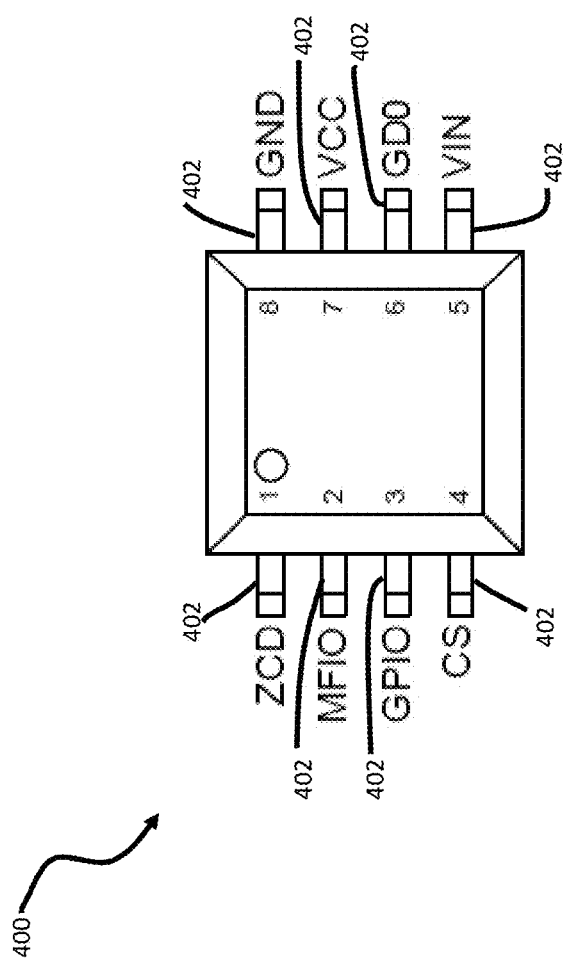
FIG. 13 illustrates packaging of an embodiment PFC controller.

FIG. 13 illustrates package 400 for an embodiment general purpose controller integrated circuit (IC) that can be used to implement the PFC algorithms of the present invention. Package 400 contains leads 402. Leads 402 include leads for ground (GND), the IC power supply (VCC), the voltage input (VIN), current sense (CS), multi-function input output (MFIO), general-purpose input output (GPIO), gate drive (GDO), and zero crossing detection (ZCD). It should be understood that the package 400 is just one example of many package types that may be used for embodiment controller ICs.

Figure 14:
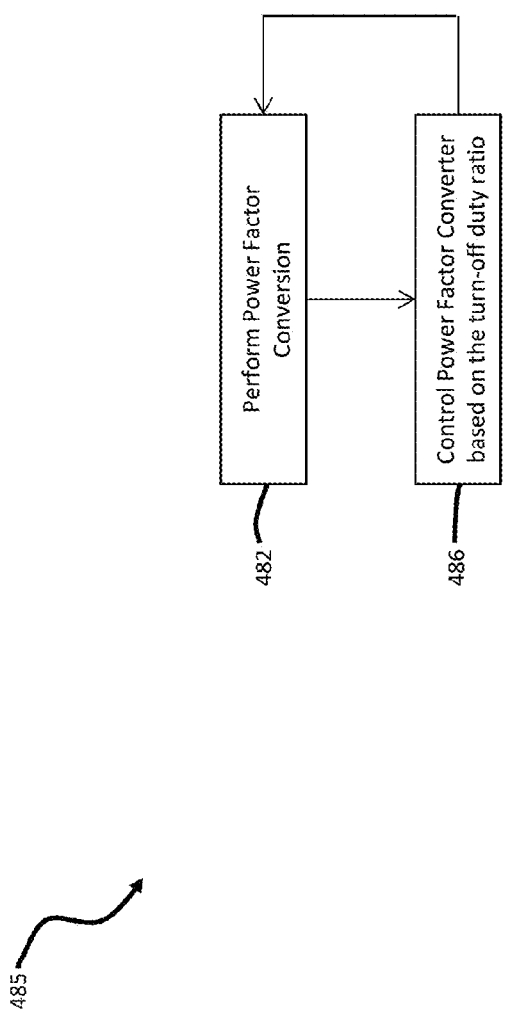
FIG. 14 illustrates a flowchart for an embodiment method of performing power factor correction.

FIG. 14 illustrates a flowchart for a method 485 of controlling a PFC using a turn-off duty cycle as a control variable. In step 482, the PFC produces an output. The PFC outputs an output voltage based on the input voltage. In step 486, a controller controls the PFC in a feedback loop. This is done using one feed forward controller in CCM and two feed forward controllers in DCM. The turn-off duty cycle is used as the control variable.

Figure 15:
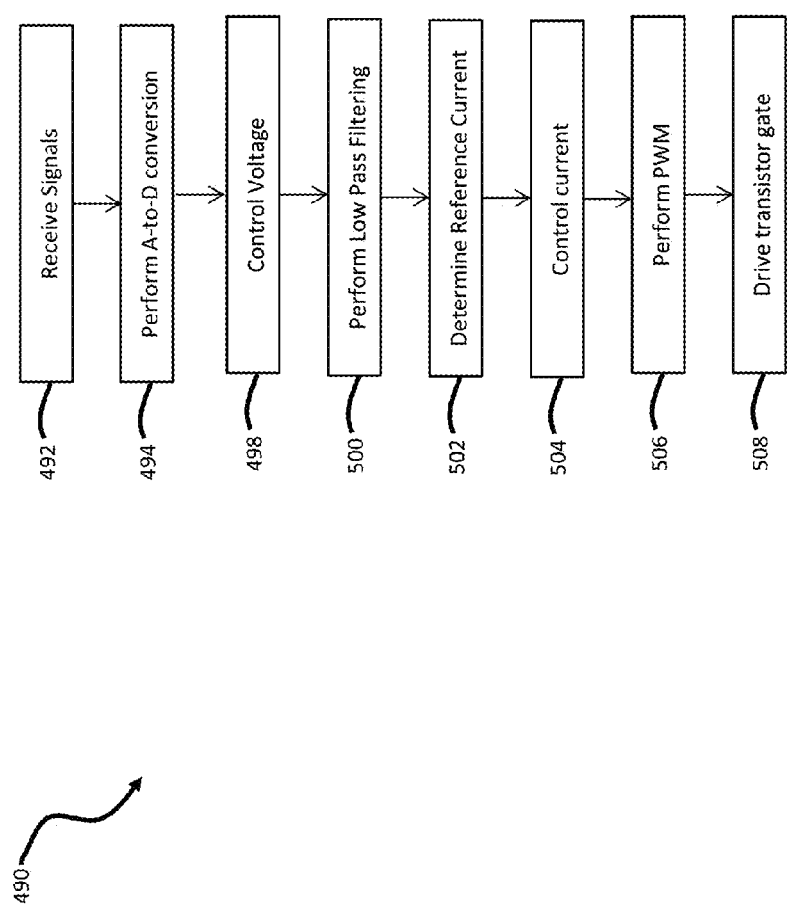
FIG. 15 illustrates a flowchart for an embodiment method of controlling a PFC.

FIG. 15 illustrates a flowchart for a method 490 of controlling the inductor current in a PFC. Initially, in step 492, the controller receives a signal. Next, in step 494, analog-to-digital conversion is performed on input signals, the output voltage $v_o$, the input voltage $v_g$, and the inductor current $i_L$.

In step 498, the voltage is controlled based on the output voltage. The output voltage is filtered, for example, using a first order low pass filter, a notch filter, or a dead zone controller. A multiplication constant is generated. A PI, PID, or other feedback control scheme may be used. In step 500, low pass filtering is performed on the input voltage, which may be performed, for example, by using a two-stage low pass filter with two cascaded poles, a first order low pass filter, or another low pass filter. Next, in step 502, the reference current is determined based on the input voltage, the output of the voltage control loop and the input voltage feed forward. A constant is used as a constant of proportionality. The current is controlled in step 504 using an inner current control loop. The same control loop is used for CCM and DCM operation. The selection of feed forward control during CCM and DCM is based on a factor $(d+\Delta_1)$ which is equal to one in CCM and less than one in DCM. Finally, pulse width modulation is applied to the output of step 504 in step 506, and the transistor gate is driven based on this in step 508.

Figure 16:
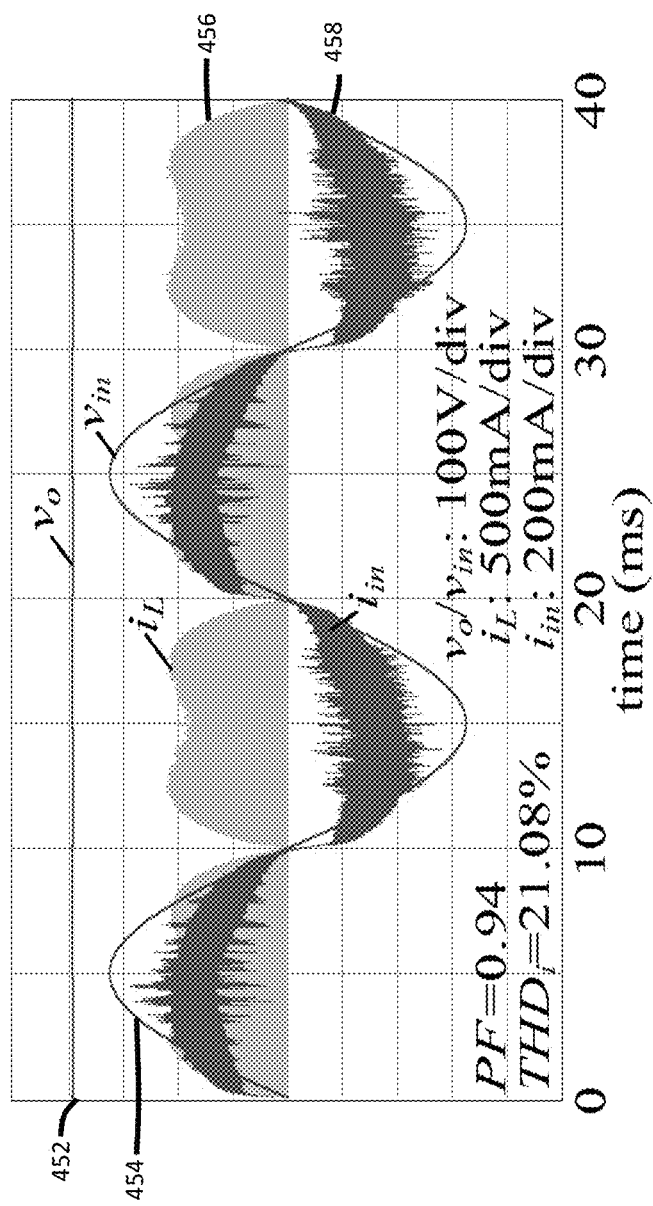
FIG. 16 illustrates a graph of current and voltage waveforms for an analog controller in CCM.

FIG. 16 illustrates a graph for simulation results at 230 VAC and 20% load of a 300 W boost PFC using a conventional CCM analog controller. These simulation results that show the current and voltage waveforms at 230 VAC and 20% load using a CCM analog controller. The converter operates fully in DCM (discontinuous conduction mode in the inductor current iL). The analog controller is designed for CCM operation. When it is applied to control in DCM, distortion in the current results. Accordingly, this figure illustrates a graph of current and voltage waveforms for a CCM analog controller when the converter operates fully in DCM. Curve 452 shows $v_o$, curve 454 shows $v_{in}$, curve 456 shows $i_L$, and curve 458 shows $i_{in}$. The power factor (PF) is 0.94. In addition, total harmonic distortion (THD) is 21.08%.

Figure 17:
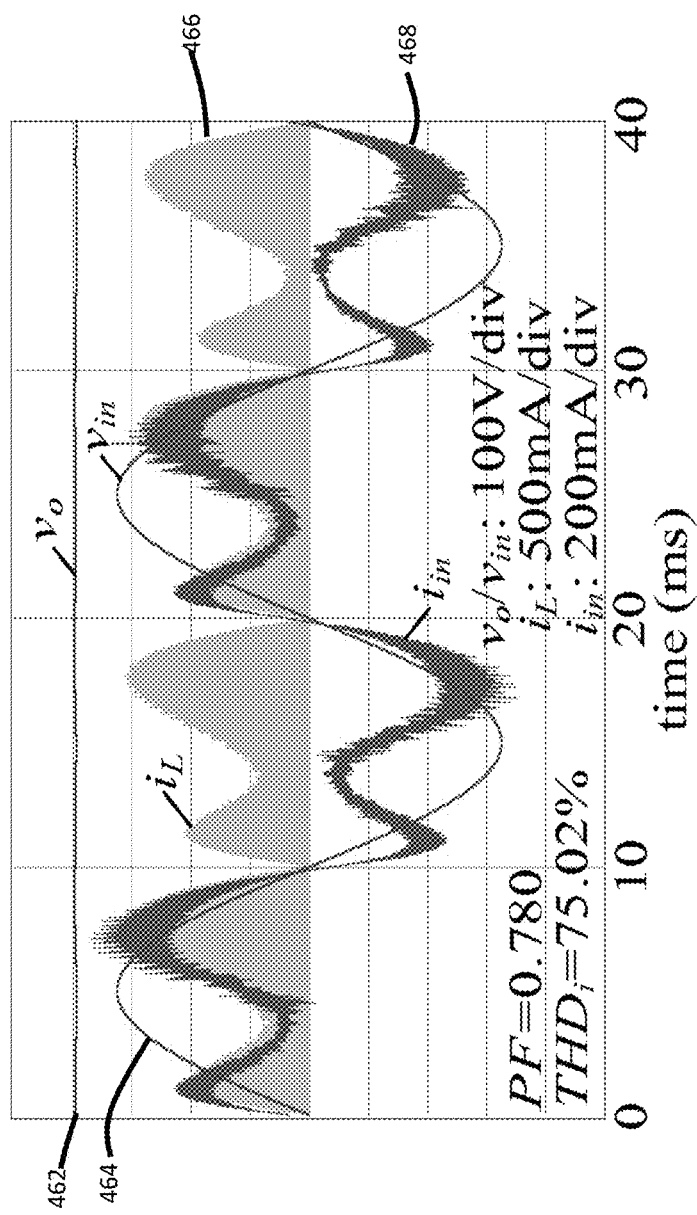
FIG. 17 illustrates a graph of current and voltage waveforms for a digital controller in CCM.

FIG. 17 illustrates a graph for simulation results at 230 VAC and 20% load of a 300 W boost PFC using a conventional CCM digital controller with eight bit analog-to digital conversion (ADC) and ten bit digital pulse width modulation (DPWM) resolution. Since, the digital controller is designed for CCM operation, when it is applied to control in DCM, distortion in the current results. This figure illustrates a graph of current and voltage waveforms for a CCM digital controller when the converter operates fully in DCM. At 230 VAC and 20% load, the converter operates fully in DCM. Curve 462 shows $v_o$, curve 464 shows $v_{in}$, curve 466 shows $i_L$, and curve 468 shows $i_{in}$. The PF is 0.780 and the THD is 75.02%.

Figure 18:
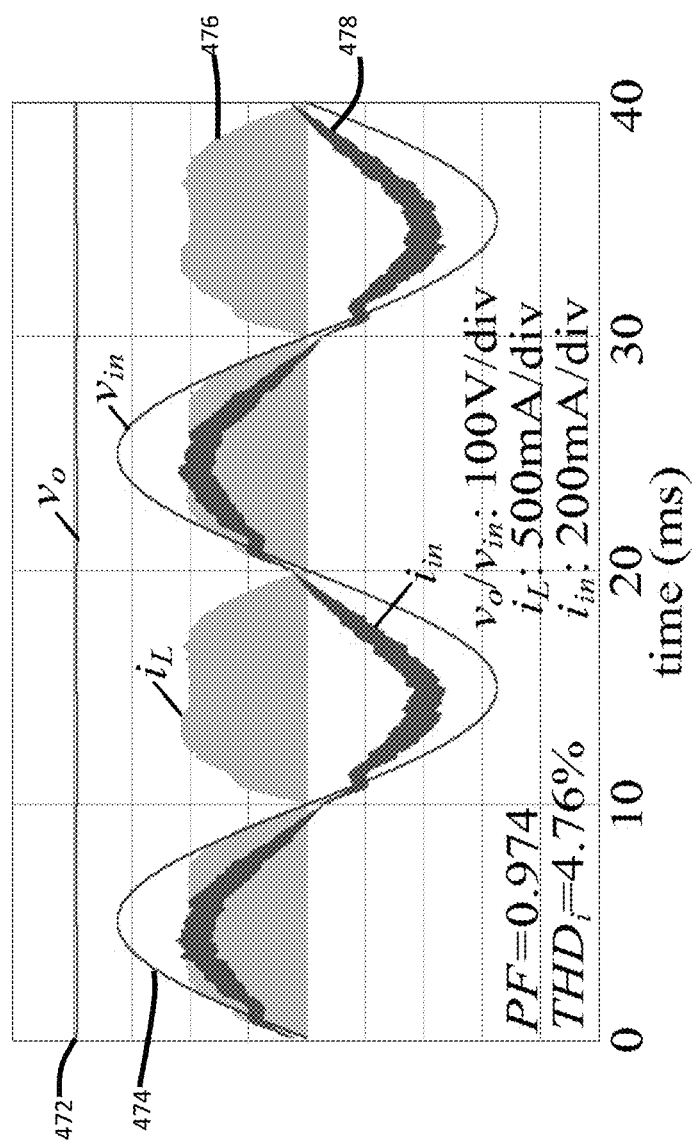
FIG. 18 illustrates a graph of current and voltage waveforms for a digital controller in CCM based on the turn-off duty cycle control.

FIG. 18 illustrates a graph for simulation results at 230 VAC and 20% load of a 300 W boost PFC using an embodiment of the turn-off duty cycle control with eight bit ADC and ten-bit DPWM resolution. Since the embodiment controller is designed for both CCM and DCM operations, it has no problem providing control in DCM and thereby reduces distortion in the current. This figure illustrates a graph of current and voltage waveforms for a digital controller based on turn-off duty cycle control when the converter operates fully in DCM. At 230 VAC and 20% load, the converter operates fully in DCM. Curve 472 shows $v_o$, curve 474 shows $v_{in}$, curve 476 shows $i_L$, and curve 478 shows $i_{in}$. Good input current shaping is achieved in DCM with an embodiment. The PF is 0.974, and the THD is 4.76%. There is a significant reduction in THD of the input current and the power factor is improved as compared to the CCM analog controller and the CCM digital controller. Moreover, PF is improved as a result of the decreased THD. It should be understood that the simulation results shown in FIG. 18 represent the performance of a single embodiment under a certain set of conditions. The performance of alternative embodiments may be different depending on the particular embodiment and its specifications.

In accordance with an embodiment, a power supply controller includes a current controller configured to control an input current of a power supply. The current controller includes a first feed forward controller having an input configured to be coupled to a first power supply signal, and an output coupled to an output of the current controller. A gain of the first feed forward controller is proportional to a compensation factor when the power supply operates in a discontinuous conduction mode (DCM) and is substantially zero when the power supply operates in a continuous conduction mode (CCM). The first feed forward controller may be shut off when the power supply operates in the CCM.

In an embodiment, the current controller further includes a second feed forward controller coupled to the first feed forward controller and/or may include a digital circuit. The power supply controller may also include a switch driver coupled to the current controller. In some embodiments, the compensation factor is 1−(d+Δ1), where d is a ratio of a time in which an inductor of the power supply conducts current in a first direction to a switching period, and Δ1 is a ratio of a time in which the inductor of the power supply conducts current in a second direction opposite the first direction to the switching period.

In accordance with various embodiments, the power supply controller also includes a voltage controller configured to produce a control voltage in accordance with an output voltage, and may further includes a multiplier block configured to determine a reference current in accordance with the control voltage and an input voltage, such that the current controller is configured to control the input current of the power supply in accordance with the reference current. The power supply controller may also include a low pass filter coupled to the multiplier block, such that the low pass filter is configured to filter the input voltage to produce an equivalent direct current (DC) voltage. The multiplier block may be further configured to determine the reference current in accordance with an equivalent DC voltage. In some embodiments, the multiplier block is further configured to determine that the reference current is equal to a first constant times the input voltage times the control voltage divided by a square of the equivalent DC voltage.

In an embodiment, the power supply controller further includes a pulse width modulator coupled to the current controller and/or a lookup table configured to determine at least a portion of the compensation factor. The power supply controller may also include a multiplier, such that the multiplier is configured to perform a multiplication operation used in determining the compensation factor, and the lookup table is configured to perform a division operation used in determining the compensation factor.

In accordance with a further embodiment, a switched-mode power supply includes an inductor coupled between an input terminal and an output terminal, a switch coupled to the inductor, a current sensor configured to detect a current of the switched-mode power supply, and a power supply controller coupled to the switch and to the current sensor. The power supply controller includes a first feed forward controller having an input configured to be coupled to a first power supply signal, and an output coupled to an output of the power supply controller. A gain of the first feed forward controller is multiplied by a compensation factor when the power supply operates in a discontinuous conduction mode (DCM) and is substantially zero when the power supply operates in a continuous conduction mode (CCM).

The power supply controller may further include a second feed forward controller coupled to the first feed forward controller, and/or may further include a switch driver coupled between the switch and the power supply controller, such that the switch driver is configured to drive the switch. In an embodiment, the compensation factor is 1−(d+Δ1), where d is a ratio of a time in which an inductor of the power supply conducts current in a first direction to a switching period, and Δ1 is a ratio of a time in which the inductor of the power supply conducts current in a second direction opposite the first direction to the switching period.

In accordance with a further embodiment, a method of controlling a power converter includes receiving a measured current of the power converter to produce a received measured current, determining an error current in accordance with the received measured current and a reference current, and determining a power supply control signal comprising using a current controller having a main current controller responsive to the error current and a first feed forward controller responsive to a signal of the power supply. A gain of the first feed forward controller is multiplied by a compensation factor when the power supply operates in a discontinuous conduction mode (DCM) and is substantially zero when the power supply operates in a continuous conduction mode (CCM).

The method may further include controlling a current of the power converter in accordance with the power supply control signal, which may be a turn-off duty cycle of the power converter. The method may further include filtering the input voltage to produce an equivalent direct current (DC) voltage, such that determining the reference current is further performed in accordance with an equivalent DC voltage.

Advantages of embodiments include a PFC that provides a good input current shaping in both CCM and DCM modes. Good input current shaping leads to lower total harmonic current distortion, higher power factor, and higher efficiency. Lower RMS current drawn causes lower losses. This control scheme has one fewer feed forward controller and thus one fewer multiplication computation in CCM than a controller using the turn-on duty cycle control. The resulting saved computation time in CCM may help facilitate a higher switching frequency. For example, some embodiments may have a switching frequency of 67 kHz or greater. A further advantage of some embodiments include the ability to automatically transition between CCM mode and DCM mode.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A power supply controller comprising:
  a current controller configured to control an input current of a power supply, the current controller comprising:
    a first feed forward controller having an input configured to be coupled to a first power supply signal, and an output coupled to an output of the current controller, wherein a gain of the first feed forward controller is proportional to a compensation factor when the power supply operates in a discontinuous conduction mode (DCM) and is substantially zero when the power supply operates in a continuous conduction mode (CCM).

2. The power supply controller of claim 1, wherein the first feed forward controller is shut off when the power supply operates in the CCM.

3. The power supply controller of claim 1, wherein the current controller further comprises a second feed forward controller coupled to the first feed forward controller.

4. The power supply controller of claim 1, wherein the current controller comprises a digital circuit.

5. The power supply controller of claim 1, further comprising a switch driver coupled to the current controller.

6. The power supply controller of claim 1, wherein the compensation factor is 1−(d+Δ$_1$), where d is a ratio of a time in which an inductor of the power supply conducts current in a first direction to a switching period, and Δ$_1$ is a ratio of a time in which the inductor of the power supply conducts current in a second direction opposite the first direction to the switching period.

7. The power supply controller of claim 1, further comprising a voltage controller configured to produce a control voltage in accordance with an output voltage.

8. The power supply controller of claim 1, further comprising a pulse width modulator coupled to the current controller.

9. The power supply controller of claim 1, further comprising a lookup table configured to determine at least a portion of the compensation factor.

10. The power supply controller of claim 7, further comprising a multiplier block configured to determine a reference current in accordance with the control voltage and an input voltage, wherein the current controller is configured to control the input current of the power supply in accordance with the reference current.

11. The power supply controller of claim 9, further comprising a multiplier, wherein the multiplier is configured to perform a multiplication operation used in determining the compensation factor and the lookup table is configured to perform a division operation used in determining the compensation factor.

12. The power supply controller of claim 10, further comprising a low pass filter coupled to the multiplier block, wherein the low pass filter is configured to filter the input voltage to produce an equivalent direct current (DC) voltage, and wherein the multiplier block is further configured to determine the reference current in accordance with an equivalent direct current (DC) voltage.

13. The power supply controller of claim 12, wherein the multiplier block is further configured to determine that the reference current is equal to a first constant times the input voltage times the control voltage divided by a square of the equivalent direct current (DC) voltage.

14. A switched-mode power supply comprising:
an inductor coupled between an input terminal and an output terminal;
a switch coupled to the inductor;
a current sensor configured to detect a current of the switched-mode power supply; and
a power supply controller coupled to the switch and to the current sensor, the power supply controller comprising a first feed forward controller having an input configured to be coupled to a first power supply signal, and an output coupled to an output of the power supply controller, wherein a gain of the first feed forward controller is multiplied by a compensation factor when the power supply operates in a discontinuous conduction mode (DCM) and is substantially zero when the power supply operates in a continuous conduction mode (CCM).

15. The switched-mode power supply of claim 14, wherein the power supply controller further comprises a second feed forward controller coupled to the first feed forward controller.

16. The switched-mode power supply of claim 14, further comprising a switch driver coupled between the switch and the power supply controller, wherein the switch driver is configured to drive the switch.

17. The switched-mode power supply of claim 14, wherein the compensation factor is $1-(d+\Delta_1)$, where d is a ratio of a time in which an inductor of the power supply conducts current in a first direction to a switching period, and $\Delta_1$ is a ratio of a time in which the inductor of the power supply conducts current in a second direction opposite the first direction to the switching period.

18. A method of controlling a power converter, the method comprising:
receiving a measured current of the power converter;
determining an error current in accordance with the measured current and a reference current; and
determining a power supply control signal comprising using a current controller having a main current controller responsive to the error current and a first feed forward controller responsive to a signal of the power supply, wherein a gain of the first feed forward controller is multiplied by a compensation factor when the power supply operates in a discontinuous conduction mode (DCM) and is substantially zero when the power supply operates in a continuous conduction mode (CCM).

19. The method of claim 18, further comprising controlling a current of the power converter in accordance with the power supply control signal.

20. The method of claim 18, wherein the power supply control signal is a turn-off duty cycle of the power converter.

21. The method of claim 18, further comprising filtering the input voltage to produce an equivalent direct current (DC) voltage, wherein determining the reference current is further performed in accordance with an equivalent direct current (DC) voltage.

* * * * *